United States Patent [19]

Scherf et al.

[11] Patent Number: 5,516,186
[45] Date of Patent: May 14, 1996

[54] LID FOR A VEHICLE ROOF

[75] Inventors: Wilhelm Scherf, Rodgau; Dieter Federmann, Hanau, both of Germany

[73] Assignee: Rockwell International GmbH, Germany

[21] Appl. No.: 492,651

[22] Filed: Jun. 20, 1995

[30] Foreign Application Priority Data

Jun. 28, 1994 [DE] Germany ............................. 4422176.2

[51] Int. Cl.⁶ ........................................ B60J 10/12
[52] U.S. Cl. .................. 296/216; 49/480.1; 49/484.1; 49/490.1; 49/495.1
[58] Field of Search ............... 296/216, 146.15–146.16; 52/204.591; 49/480.1, 484.1, 490.1, 495.1

[56] References Cited

U.S. PATENT DOCUMENTS 4,614,061  9/1986  Brocke ........................... 49/495.1
4,720,138  1/1988  Schlapp et al. .................... 296/222

FOREIGN PATENT DOCUMENTS 538531   7/1959  Belgium ........................... 49/490.1
2608713  6/1988  France ............................. 49/495.1

Primary Examiner—Dennis H. Pedder

[57] ABSTRACT

In a glass lid (3) for a vehicle roof, the lid plate (4) of which, of glass, is supported from beneath by a reinforcing frame (5), the reinforcing frame (5) projects with a flange (6) beyond the edge of the lid plate (4). Onto the flange (6) an edge gap sealing profile (7) with a clamping groove (8) is pushed. The gap-free sealing between the edge gap sealing profile (7) and the rounded lid plate edge (20) is provided by a specially shaped sealing lip (16) of the edge gap sealing profile, which is subdivided for this purpose into two arms (23, 24) which, when the edge gap sealing profile (7) is pushed onto the flange (6), are automatically pressed tightly and with elastic prestress against the lid plate edge (20).

5 Claims, 3 Drawing Sheets

LID FOR A VEHICLE ROOF

FIELD OF THE INVENTION

This invention relates to a lid for a vehicle roof, more particularly the present invention relates to glass lids used for example in lifting sliding and sliding-lifting roofs.

BACKGROUND OF THE INVENTION

In the case of glass lids, particular importance attaches to the construction and fitting of an edge gap sealing profile to the lid plate. On the one hand, it must be possible to fit the edge gap sealing profile to the glass lid at minimum cost and trouble, but on the other hand not only must the edge gap sealing profile provide sealing with respect to the roof opening of the vehicle when the roof is closed, but also a reliable seal must be obtained between the edge gap sealing profile and the lid plate.

In one known vehicle glass lid (DE 93 07 831.5 U1) a pushed-on edge gap sealing profile has a plane surface of a solid region of the edge gap sealing profile which bears against the edge of the lid plate and a sealing lip engages over the outer surface of the lid plate and bears from above against the lid plate. Not only does this result in an undesired step formation between the sealing lip and the outer surface of the lid plate, but the sealing action between the edge gap sealing profile and the lid plate leaves something to be desired. Moisture and contaminants can easily penetrate between sealing lip and lid plate and also are not reliably kept away from the bearing surface between the solid region of the edge gap sealing profile and the edge of the lid plate.

An object of the present invention is to provide a lid preferably of glass for a vehicle roof in which a reliable seal is obtained between the lid plate and the edge gap sealing profile.

SUMMARY OF THE INVENTION

According to the invention, a sealing lip of a sealing profile is orientated, with its outer surface, towards the rounded edge of a lid plate, so that the sealing lip, when it is pushed onto a flange projecting beyond the edge of the lid plate, bears with its outer surface against the edge of the lid plate. A groove-like depression in the outer surface of the sealing lip ensures, in cooperation with the form of the sealing lip, a reliable seal in particular manner when seating the lid plate edge. A longer arm of the sealing lip then bears, with resilient prestress, sealingly against the lid plate edge, the pivotal inward deformation of the longer arm being limited by abutting against the solid inner region of the edge gap sealing profile. Simultaneously with the inward pivotal movement, the longer arm, which forms together with the shorter arm of the sealing lip an angular structure, entrains the shorter arm in the direction of pivoting by lever action through the material thickening situated in an apex region of the two arms, causing the shorter arm to be very firmly pressed against an upper region of the lid plate edge. The result is that the outer surface of the sealing lip bears sealingly, over the region that is important for sealing, against the peripheral surface of the lid plate edge, so that no moisture or dirt particles can penetrate between the edge gap sealing profile and lid plate edge. This advantageous sealing action is produced positively by the form of construction according to this invention, by simple pushing-on of the edge gap sealing profile onto the aforementioned flange of the reinforcing frame. Even if dimensional deviations in the lid plate occur, such as can arise by grinding tolerances at the edge of the glass lid, the invention ensures compensation without adversely affecting the sealing action.

Preferably the upper surface of the profile is situated approximately in the plane of the outer surface of the lid plate and the resilient deformation of the profile when pushed onto the flange is limited to the sealing lip itself and to the adjoining recess without the upper surface bulging. In this case the edge gap sealing profile is so formed that the resilient deformation is limited basically to the sealing lip itself and the adjacent recess. In this way it becomes possible, even when the edge gap sealing profile is pushed on, to obtain a substantially planar upper surface without bulge, which adjoins without downward or upward steps the outer surface of the lid plate.

A U-shaped reinforcing metal inlay is preferably embedded into the profile which surrounds the clamping groove for the flange, the clamping groove being provided with projections which ensure a firm seating of the edge gap sealing profile on the flange of the reinforcing frame, so that the elastic deformations of certain regions of the edge gap sealing profile that occur in desired manner during pushing-on are reliably maintained.

BRIEF DESCRIPTION OF THE DRAWINGS

Further details of the invention are explained below by reference to the attached drawings illustrating two examples of embodiment thereof. The figures in the drawings show.

DETAILED DESCRIPTION OF THE PREFERRED EMBODIMENTS

Figure 1:
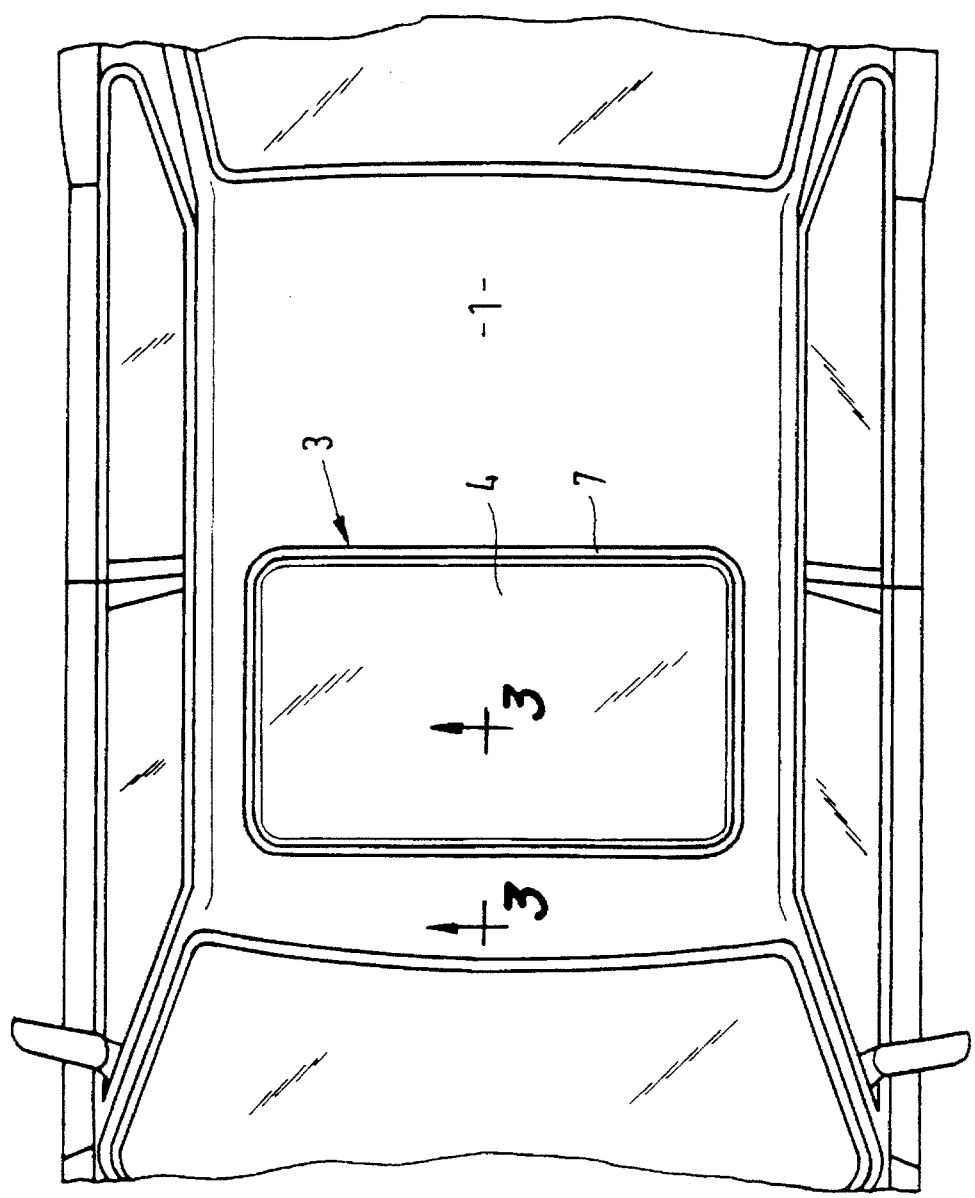
FIG. 1 a plan on a vehicle roof with a glass lid in the closed position.
Figure 3:
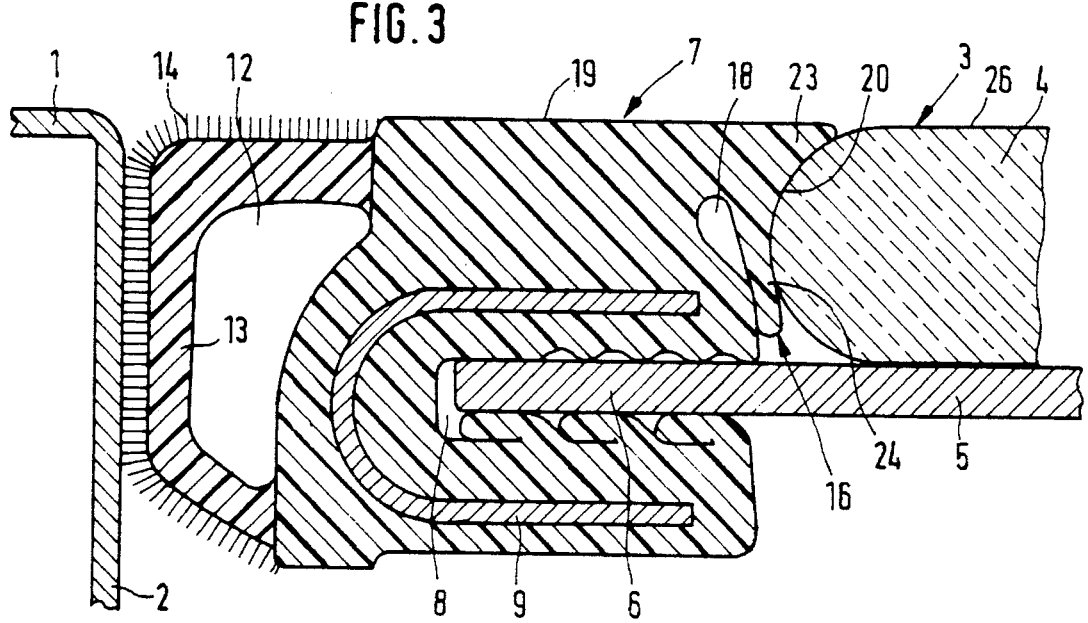
FIG. 3 the partial section along line III—III in FIG. 1 through the front edge of the glass lid with edge gap sealing profile according to FIG. 2 pushed onto the reinforcing frame, and FIG. 4 a section similar to FIG. 3, but with a further example of embodiment of the reinforcing frame, onto which the edge gap sealing profile according to FIG. 2 has been pushed.
Figure 4:
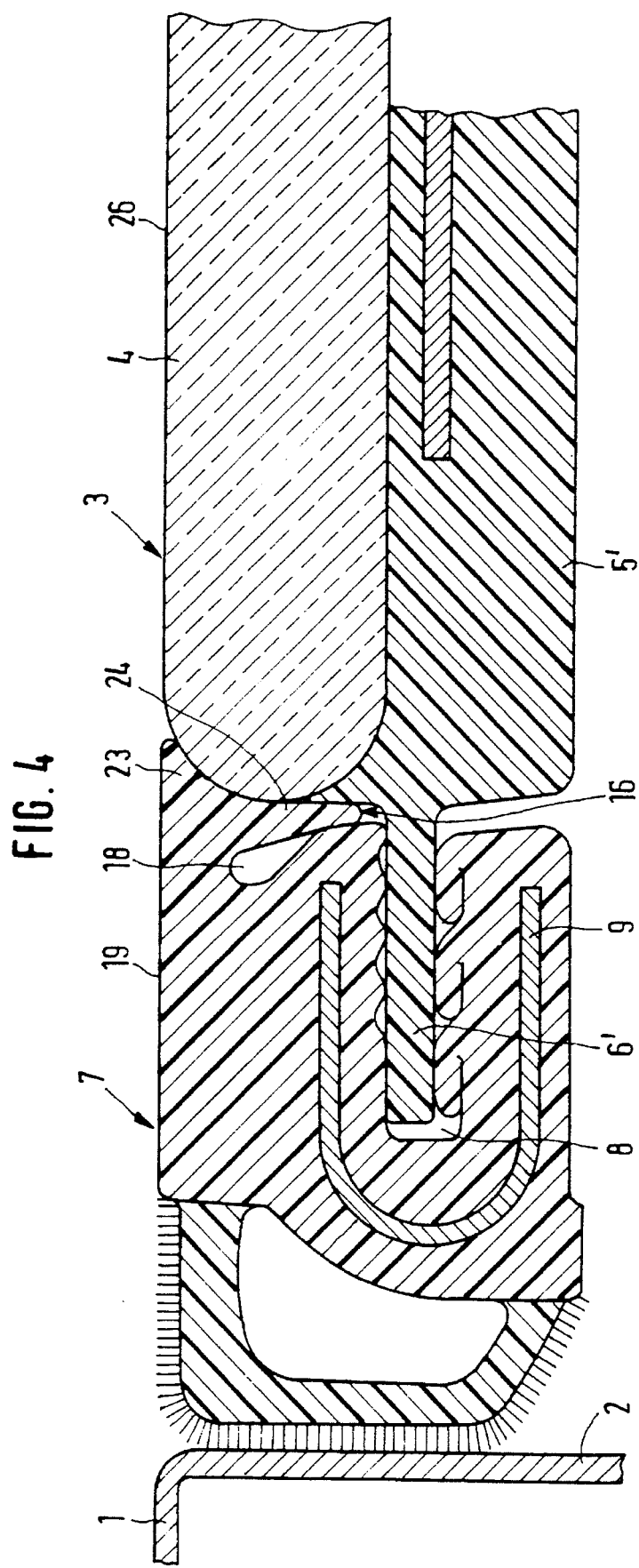

As can be seen from FIG. 1 in conjunction with FIGS. 3 and 4, in the forward region of the fixed vehicle roof 1 there is, in the usual manner for roof constructions of this type, a roof opening 2, which is closed in the closed position by a glass lid 3. The glass lid 3 is displaceable in the usual way out of the roof opening 2 to expose the latter at least partially. The guide and actuating elements serving for the displacement are not illustrated, because the invention does not relate to them.

The glass lid consists of a lid plate 4, adapted to the roof curvature, made of glass or a glass-like substance. In the edge region the lid plate 4 is supported from beneath by a metal reinforcing frame 5, which is firmly connected to the lid plate 4 and projects all around the periphery beyond the edge of the lid plate 4 with a horizontal flange 6, as the example according to FIG. 3 illustrates. In the embodiment according to FIG. 4, a reinforcing frame 5' is provided, composed of a plastics frame moulded-on from below and an embedded metal frame, this reinforcing frame projecting with a horizontal flange 6' beyond the edge of the lid plat 4 all around the glass lid.

Figure 2:
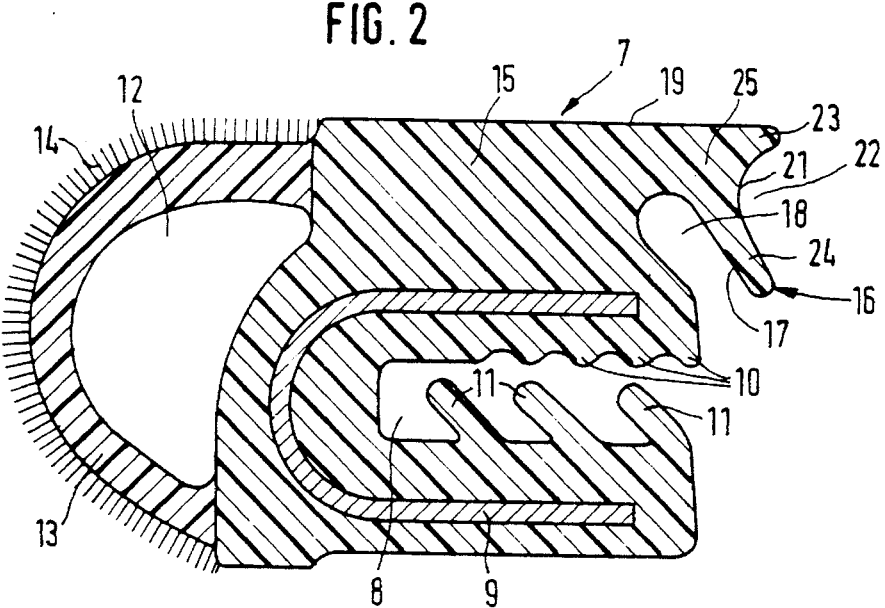
FIG. 2 a cross section through an edge gap sealing profile in the at-rest position, i.e. before being pushed onto the lid reinforcing frame, 2

With both forms of embodiment of the reinforcing frame according to FIGS. 3 and 4 there is associated an edge gap sealing profile 7 according to FIG. 2, identical in shape and dimensions, which is pushed onto the flange 6, 6' respectively in clamping manner with a horizontal clamping groove 8. Into the edge gap sealing profile 7 a metal reinforcing inlay 9 is embedded, which surrounds the clamping groove 8 in U-shape. Furthermore, as can best be seen from FIG. 2, on the mutually facing wall surfaces of the clamping groove 8 there are clamping projections, which in the example of embodiment illustrated are formed on the upper wall surface as parallel ribs 10 with depressions between them and on the lower wall surface as barbed clamping projections 11. The reinforcing inlay 9, the ribs 10 and the clamping projections 11 jointly ensure a firm seating on the edge gap sealing profile 7, pushed onto the flange 6, 6' respectively.

For a more detailed explanation of the edge gap sealing profile 7, reference is now made to FIG. 2. The main body of the edge gap sealing profile 7, into which the reinforcing inlay 9 is also embedded, is of an elastomeric material of suitable hardness. This main body is adjoined at the outer side by a hollow chamber 12, so that the edge gap sealing profile exhibits a greater deformability at its outer side in order to ensure a tight closure against the peripheral edge of the roof opening 2. The hollow chamber 12 is, on the one hand, bounded by the main body of the edge gap sealing profile 7 and, on the other hand, by a comparatively thin outer wall 13. The elastomer material of the outer wall 13 can be of a lower hardness than the main body. The outer wall 13 is provided, on its external surface, with a brush-shaped flock coating 14. Above the clamping groove 8 and the reinforcing inlay 9, there is the solid region 15 of the edge gap sealing profile 7. This region is only slightly deformable due to the amount of material here and the stiffening action of the reinforcing inlay 9. This solid region is adjoined on the inner side of the edge gap sealing profile 7 by a specially shaped sealing lip 16, the inner surface 17 of which is formed partly by a recess 18, extending into the solid region 15. The recess 18 terminates in the solid region 15 at a considerable distance from the upper face 19 of the edge gap sealing profile.

The outer face 21 of the sealing lip 16, facing towards the rounded lid plate edge 20 when the edge gap sealing profile 7 is pushed onto the flange 6 or 6' respectively, has a groove-like depression 22, by which the sealing lip 16 is divided into a shorter upper arm 23 and a longer lower arm 24. The longer arm 24, bounded on the one side by the outer surface 21 of the groove-like depression 22 and on the other side by the inner face 17 of the sealing lip 16, is orientated obliquely downwards and towards the lid plate edge 20 when the edge gap sealing profile is not pushed on. The shorter arm 23, bounded on the one side by the outer surface 21 of the groove-like depression 22 and on the other side by the upper surface 19 of the solid region 15, points obliquely upwards. In this way the two arms 23, 24 form an angular structure, which is connected by the common solid apex region 25 to the solid region 15.

The angular structure described of the two arms 23 and 24 in conjunction with the associated solid apex region 25 has the effect that pivotal movement of the one arm are partly transmitted to the other arm and in the same rotational direction. If the described edge gap sealing profile 7 is pushed onto the flange 6, 6' by means of the clamping groove 8, then the outer surface 21 of the sealing lip 16 comes into contact with the rounded lid plate edge 20. This causes a pivotal inward movement of the longer, lower arm 24, which is not completed until the inner face 17 of the sealing lip comes into bearing against the solid region 15, which on this side of the recess 18 forms the boundary of the recess. With this inward pivotal movement, a considerable decrease takes place in the volume of the recess 18. By the inward pivotal movement, the outer surface 21 of the sealing lip 16 bears sealingly with prestress against the lid plate edge 20, the upper arm 23 being pressed firmly against the upper region of the lid plate edge 20 by the lever action that occurs between the two arms as the longer arm 24 is pivoted inwards, so that no gap can form at this position. As a result of the described construction of the edge gap sealing profile 7 with the special sealing lip 16 integrally formed thereon, the elastic sealing lip 16 hugs against the, for example, semicircular, rounded lid plate 20 over a large area and forms a close seal, the elastic pressure in the region of the shorter, upper arm 23 being particularly high.

As can be seen from FIGS. 3 and 4, the upper surface 19 of the edge gap sealing profile 7 is situated approximately in the same plane as the outer surface 26 of the lid plate 4, i.e. by the special form of construction of the edge gap sealing profile 7 the elastic deformation of the edge gap sealing profile when it is pushed onto the flange 6 or 6' respectively, is limited to the sealing lip 16 itself and the recess 18 adjoining it, without substantial upward bulging of the upper surface 19 of the edge gap sealing profile 7.

The principles, preferred embodiments and modes of construction of the present invention have been described in the foregoing specification. The invention is not to be construed as limited to the particular forms disclosed, since these are regarded as illustrative rather than restrictive. Moreover, variations and changes may be made by those skilled in the art without departing from the spirit of the invention.

I/We claim:

1. A lid for a vehicle roof adapted to be moved from a closed position closing an opening in the roof to an open position in which the opening is at least partly open, the lid comprising in combination:

(i) a lid plate defined by an upper surface, a lower surface and a circumscribing edge having an edge surface joining the upper and lower surfaces, (ii) reinforcing frame means bearing on an edge region of said lower surface so as to support said plate, (iii) flange means extending from said frame means outwardly in a direction away from said edge surface, (iv) a sealing profile adapted to seal with a concave surface of a sealing lip of the profile against said lid plate edge surface and to receive and engage said flange means by means of a clamping groove in the profile, (v) said sealing profile having a solid central region, (vi) said sealing lip being defined by an upper arm and a lower arm longer than the upper arm, said concave surface extending between the arms, (vii) said lower arm adjoining a recess extending into said solid region above said flange means receiving clamping groove, whereby when the profile is pushed onto said lid plate and flange means, the concave surface and arms seal against the lid plate, said lower arm pivoting away from the lid plate edge surface into the recess so as to reduce the volumetric size of the recess.

2. The lid of claim 1 wherein the lid plate is formed of glass and wherein the sealing profile has an upper surface in substantially the same plane as the outer surface of the lid plate when pushed onto said flange means.

3. The lid of claim 1 wherein a U-shaped metal reinforcement is embedded in said profile so as to surround said clamping groove, said groove having a surface formed with projections thereon engaging with said flange means.

4. The lid of claim 1 wherein the lid plate edge surface is convex.

5. The lid of claim 1 wherein the flange means is formed as a plastics extension of said frame means, said flange means extending horizontally beyond the edge surface of the plate into the profile.

* * * * *